United States Patent
Taylor et al.

(10) Patent No.: US 7,917,286 B2
(45) Date of Patent: Mar. 29, 2011

(54) DATABASE ASSISTED OCR FOR STREET SCENES AND OTHER IMAGES

(75) Inventors: Bret Taylor, Menlo Park, CA (US); Luc Vincent, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 27 days.

(21) Appl. No.: 11/305,694

(22) Filed: Dec. 16, 2005

(65) Prior Publication Data

US 2007/0140595 A1    Jun. 21, 2007

(51) Int. Cl.
*G06K 9/03* (2006.01)
*G01C 21/00* (2006.01)

(52) U.S. Cl. ...... 701/208; 382/104; 707/102; 707/104.1

(58) Field of Classification Search .................. 701/201, 701/207, 208, 213; 725/91, 114, 211; 340/531, 340/105, 995.19, 933; 735/91, 114, 90; 382/229, 382/275, 272, 305, 104, 103, 299, 187, 310; 348/142; 342/357.01; 705/1, 11, 5, 28, 26; 707/3, 10, 102, 104.1
See application file for complete search history.

(56) References Cited

U.S. PATENT DOCUMENTS

| | | | |
|---|---|---|---|
| 4,972,319 A | 11/1990 | DeLorme | |
| 5,051,928 A | 9/1991 | Gruters | |
| 5,559,707 A | 9/1996 | DeLorme et al. | |
| 5,579,471 A | 11/1996 | Barber et al. | |
| 5,613,051 A | 3/1997 | Iodice et al. | |
| 5,615,324 A | 3/1997 | Kuboyama | |
| 5,646,751 A | 7/1997 | Motamed et al. | |
| 5,724,579 A | 3/1998 | Suzuki | |
| 5,737,533 A | 4/1998 | de Hond | |
| 5,760,783 A | 6/1998 | Migdal et al. | |
| 5,768,633 A | 6/1998 | Allen et al. | |
| 5,802,492 A | 9/1998 | DeLorme et al. | |
| 5,848,373 A | 12/1998 | DeLorme et al. | |

(Continued)

FOREIGN PATENT DOCUMENTS

CA    2169421    11/1996

(Continued)

OTHER PUBLICATIONS

Cosman, M., "Global Terrain Texture: Lowering the Cost," Proceedings of the 1994 Image VII Conference, Tempe, Arizona: The Image Society, pp. 53-64.

(Continued)

*Primary Examiner* — Ronnie Mancho
(74) *Attorney, Agent, or Firm* — Fenwick & West LLP (57) ABSTRACT

Optical character recognition (OCR) for images such as a street scene image is generally a difficult problem because of the variety of fonts, styles, colors, sizes, orientations, occlusions and partial occlusions that can be observed in the textual content of such scenes. However, a database query can provide useful information that can assist the OCR process. For instance, a query to a digital mapping database can provide information such as one or more businesses in a vicinity, the street name, and a range of possible addresses. In accordance with an embodiment of the present invention, this mapping information is used as prior information or constraints for an OCR engine that is interpreting the corresponding street scene image, resulting in much greater accuracy of the digital map data provided to the user.

36 Claims, 4 Drawing Sheets

U.S. PATENT DOCUMENTS

| | | |
|---|---|---|
| 5,884,247 A | 3/1999 | Christy |
| 5,910,805 A | 6/1999 | Hickey et al. |
| 5,926,116 A | 7/1999 | Kitano et al. |
| 5,938,709 A | 8/1999 | Hale et al. |
| 6,002,809 A | 12/1999 | Feig |
| 6,023,241 A | 2/2000 | Clapper |
| 6,031,963 A | 2/2000 | Kitamura et al. |
| 6,054,990 A | 4/2000 | Tran |
| 6,055,536 A | 4/2000 | Shimakawa et al. |
| 6,098,015 A | 8/2000 | Nimura et al. |
| 6,100,897 A | 8/2000 | Mayer et al. |
| 6,111,583 A | 8/2000 | Yaron et al. |
| 6,144,338 A | 11/2000 | Davies |
| 6,148,105 A | 11/2000 | Wakisaka et al. |
| 6,167,382 A | 12/2000 | Sparks et al. |
| 6,181,817 B1 | 1/2001 | Zabih et al. |
| 6,182,010 B1 | 1/2001 | Berstis |
| 6,202,026 B1 | 3/2001 | Nimura |
| 6,208,626 B1 | 3/2001 | Brewer |
| 6,208,934 B1 | 3/2001 | Bechtolsheim |
| 6,233,523 B1 | 5/2001 | Sood |
| 6,247,019 B1 | 6/2001 | Davies |
| 6,252,608 B1 | 6/2001 | Snyder et al. |
| 6,262,741 B1 | 7/2001 | Davies |
| 6,266,614 B1 | 7/2001 | Alumbaugh |
| 6,272,231 B1 | 8/2001 | Maurer et al. |
| 6,278,938 B1 | 8/2001 | Alumbaugh |
| 6,301,370 B1 | 10/2001 | Steffens et al. |
| 6,307,573 B1 | 10/2001 | Barros |
| 6,321,158 B1 | 11/2001 | DeLorme et al. |
| 6,346,938 B1 | 2/2002 | Chan et al. |
| 6,388,684 B1 | 5/2002 | Iwamura |
| 6,393,147 B2 | 5/2002 | Danneels et al. |
| 6,421,053 B1 | 7/2002 | Johns et al. |
| 6,470,264 B2 | 10/2002 | Bide |
| 6,473,691 B1 | 10/2002 | Winter et al. |
| 6,496,189 B1 | 12/2002 | Yaron et al. |
| 6,504,571 B1 | 1/2003 | Narayanaswami et al. |
| 6,538,656 B1 | 3/2003 | Cheung et al. |
| 6,573,905 B1 | 6/2003 | MacInnis et al. |
| 6,724,382 B2 | 4/2004 | Kenyon et al. |
| 6,826,472 B1 | 11/2004 | Kamei et al. |
| 7,016,532 B2 | 3/2006 | Boncyk et al. |
| 7,054,741 B2 | 5/2006 | Harrison et al. |
| 7,136,915 B2 | 11/2006 | Rieger, III |
| 7,210,119 B2 | 4/2007 | Pothos et al. |
| 7,260,474 B1 | 8/2007 | Thayathil et al. |
| 7,353,034 B2 | 4/2008 | Haney |
| 7,373,244 B2 | 5/2008 | Kreft |
| 7,451,041 B2 | 11/2008 | Laumeyer et al. |
| 7,542,882 B2 | 6/2009 | Agrawala et al. |
| 7,565,240 B2 | 7/2009 | Tomizawa |
| 7,580,045 B2 | 8/2009 | Harrison et al. |
| 7,610,219 B2 | 10/2009 | Sayed |
| 7,617,296 B2 | 11/2009 | Bank |
| 2001/0032070 A1 | 10/2001 | Teicher |
| 2001/0034661 A1 | 10/2001 | Ferreira |
| 2001/0044837 A1 | 11/2001 | Talib et al. |
| 2002/0002478 A1 | 1/2002 | Swart et al. |
| 2002/0049728 A1 | 4/2002 | Kaku |
| 2002/0055957 A1 | 5/2002 | Ohsawa |
| 2002/0067353 A1 | 6/2002 | Kenyon et al. |
| 2002/0067374 A1 | 6/2002 | Kenyon |
| 2002/0067379 A1 | 6/2002 | Kenyon et al. |
| 2002/0089524 A1 | 7/2002 | Ikeda |
| 2002/0095328 A1 | 7/2002 | Swart et al. |
| 2002/0099613 A1 | 7/2002 | Swart et al. |
| 2002/0101568 A1 | 8/2002 | Eberl et al. |
| 2002/0102966 A1 | 8/2002 | Lev et al. |
| 2002/0103813 A1 | 8/2002 | Frigon |
| 2002/0140988 A1 | 10/2002 | Cheatle et al. |
| 2002/0156866 A1 | 10/2002 | Schneider |
| 2002/0159657 A1 | 10/2002 | DeLorme |
| 2002/0184203 A1 | 12/2002 | Naster et al. |
| 2002/0187774 A1 | 12/2002 | Ritter et al. |
| 2003/0041087 A1 | 2/2003 | Pothos et al. |
| 2003/0044068 A1 | 3/2003 | Kagehiro et al. |
| 2003/0044608 A1 | 3/2003 | Yoshizawa et al. |
| 2003/0050065 A1 | 3/2003 | Alletson et al. |
| 2003/0061211 A1 | 3/2003 | Shultz et al. |
| 2003/0078897 A1 | 4/2003 | Florance et al. |
| 2003/0164819 A1 | 9/2003 | Waibel |
| 2003/0182052 A1 | 9/2003 | DeLorme et al. |
| 2004/0004616 A1 | 1/2004 | Konya et al. |
| 2004/0128215 A1 | 7/2004 | Florance et al. |
| 2004/0153434 A1 | 8/2004 | Cogen et al. |
| 2004/0208372 A1 | 10/2004 | Boncyk et al. |
| 2005/0041862 A1 | 2/2005 | Lo |
| 2005/0065856 A1 | 3/2005 | Roberts et al. |
| 2005/0131634 A1 | 6/2005 | Ignatin |
| 2005/0171686 A1 | 8/2005 | Davis |
| 2005/0216287 A1 | 9/2005 | Crosby et al. |
| 2005/0216448 A1 | 9/2005 | Talib et al. |
| 2005/0246487 A1 | 11/2005 | Ergan et al. |
| 2005/0246627 A1 | 11/2005 | Sayed |
| 2005/0270299 A1 | 12/2005 | Rasmussen et al. |
| 2005/0270311 A1 | 12/2005 | Rasmussen et al. |
| 2005/0286493 A1* | 12/2005 | Angelhag ..................... 370/352 |
| 2006/0012677 A1 | 1/2006 | Neven et al. |
| 2006/0017562 A1* | 1/2006 | Bachelder ..................... 340/531 |
| 2006/0026202 A1 | 2/2006 | Isberg et al. |
| 2006/0041375 A1* | 2/2006 | Witmer et al. ................ 701/208 |
| 2006/0075442 A1* | 4/2006 | Meadow ......................... 725/91 |
| 2006/0123053 A1 | 6/2006 | Scannell |
| 2006/0173841 A1 | 8/2006 | Bill |
| 2006/0200383 A1 | 9/2006 | Arutunian et al. |
| 2006/0241859 A1 | 10/2006 | Kimchi et al. |
| 2006/0271286 A1 | 11/2006 | Rosenberg |
| 2007/0010942 A1 | 1/2007 | Bill |
| 2007/0011145 A1* | 1/2007 | Snyder ............................ 707/3 |
| 2007/0022007 A1 | 1/2007 | Lawe |
| 2007/0050340 A1 | 3/2007 | Von Kaenel et al. |
| 2007/0073583 A1 | 3/2007 | Grouf et al. |
| 2007/0073584 A1 | 3/2007 | Grouf et al. |
| 2007/0100801 A1 | 5/2007 | Celik et al. |
| 2007/0100802 A1 | 5/2007 | Celik |
| 2007/0100867 A1 | 5/2007 | Celik et al. |
| 2007/0106468 A1 | 5/2007 | Eichenbaum et al. |
| 2007/0154067 A1 | 7/2007 | Laumeyer et al. |
| 2007/0156524 A1 | 7/2007 | Grouf et al. |
| 2007/0156525 A1 | 7/2007 | Grouf et al. |
| 2007/0179867 A1 | 8/2007 | Glazer et al. |
| 2007/0192189 A1 | 8/2007 | Popowich et al. |
| 2007/0198182 A1 | 8/2007 | Singh |
| 2007/0203643 A1 | 8/2007 | Ramaswamy et al. |
| 2007/0239348 A1 | 10/2007 | Cheung |
| 2007/0244753 A1 | 10/2007 | Grouf et al. |
| 2007/0265858 A1 | 11/2007 | Pansari et al. |
| 2008/0027642 A1 | 1/2008 | Winberry et al. |
| 2008/0040212 A1 | 2/2008 | Grouf et al. |
| 2008/0052150 A1 | 2/2008 | Grouf et al. |
| 2008/0052151 A1 | 2/2008 | Xie et al. |
| 2010/0185514 A1 | 7/2010 | Glazer et al. |

FOREIGN PATENT DOCUMENTS

| | | |
|---|---|---|
| DE | 101 10 979 A1 | 9/2002 |
| EP | 0 920 179 A2 | 6/1999 |
| EP | 0 944 019 A2 | 9/1999 |
| EP | 0967556 A2 | 12/1999 |
| JP | 61-135270 (A) | 6/1986 |
| JP | 2000-029448 (A) | 1/2000 |
| JP | 2002-032280 (A) | 1/2002 |
| JP | 2003-208597 (A) | 7/2003 |
| WO | WO 01/04790 A1 | 1/2001 |
| WO | WO 02/082799 | 10/2002 |
| WO | WO 03/001435 A1 | 1/2003 |
| WO | WO 03/041000 A1 | 5/2003 |
| WO | WO 2004/038613 A2 | 5/2004 |
| WO | WO 2005/114476 A1 | 12/2005 |

OTHER PUBLICATIONS

Crawford, C., et al., Fast 3D Visualization of Large Image Datasets in a GIS, Earth Observation Magazine, vol. 12, No. 9, Dec. 2003, USA, pp. 1-5.

Dragan, R. V., MSN Virtual Earth 1.0, MSN Virtual Earth 1.0 review by PC Magazine, Jul. 26, 2005, [online], [retrieved on Aug. 1, 2005].

Retrieved from the Internet <URL: http://www.pcmag.com/article2/0,1895,1840750,00.asp>, pp. 1-2.

ESRI Video Clips—Demos—What is GIS?, ESRI GIS and Mapping Software, Mar. 31, 2006, [online] [Retrieved on Mar. 31, 2006] Retrieved from the InternetURL:http://gis2.esri.com/esriclips/clip.cfm?ClipID=60.

Gleicher, M. et al., "Through-the-Lens Camera Control," Proceedings SIGGRAPH '92, Computer Graphics, Jul. 1992, pp. 331-340, vol. 26, No. 2.

Leclerc et al., "TerraVision: A Terrain Visualization System," SRI International, Menlo Park, California, Tech. Note No. 540, Apr. 22, 1994.

MapQuest.Com Maps, Directions and More, [online], [retrieved on Aug. 1, 2005]. Retrieved from the Internet <URL: http://www.mapquest.com>.

Montalbano, E., Microsoft Takes on Google with Virtual Earth, IDG News Service, Jul. 25, 2005, [online], [retrieved on Aug. 1, 2005]. Retrieved from the Internet <URL: http://www.infoworld.com/article/05/07/25/HNmsvirtualearth_1.html>.

MSN Maps & Directions, [online], [retrieved on Aug. 1, 2005]. Retrieved from the Internet <URL: http://maps.msn.com/(ogxuearj4ya5au55fogcdzbt)/Home.aspx.

MSN Virtual Earth—Microsoft Internet Explorer, [online], [retrieved on Aug. 1, 2005]. Retrieved from the Internet URL:http://virtualearth.msn.com, pp. 1-3.

MSN Virtual Earth to Take on Google Earth, [online], [retrieved on Aug. 1, 2005]. Retrieved from the Internet <URL: http://blog.searchenginewatch.com/blog/050523-125208>, pp. 1-4.

MultiMap.com—Online Maps Everywhere, [online], [retrieved on Aug. 1, 2005]. Retrieved from the Internet <URL: http://multimaps.com>.

NASA World Wind, [online], [retrieved on Aug. 1, 2005]. Retrieved from the Internet <URL: http://worldwind.arc.nasa.gov/>, pp. 1-2.

Rabinovich, B., et al., "Visualization of Large Terrains in Resource-Limited Computing Environments," Proceedings of the $8^{th}$ IEEE Visualization '97 Conference, Oct. 19-24, 1997, pp. 95-102, Phoenix, Arizona.

TerraServer-USA, [online], [retrieved on Aug. 1, 2005]. Retrieved from the Internet <URL: http://terraserver.homeadvisor.msn.com/>.

whereis.com—Search Australian Maps, [online], [retrieved on Aug. 1, 2005]. Retrieved from the Internet <URL: http://www.whereis.com/whereis/home.jsp>.

Yahoo! Maps, Driving Directions, and Traffic, [online], [retrieved on Aug. 1, 2005]. Retrieved from the Internet <URL: http://maps.yahoo.com>.

Ho, T.K. et al., "Word Recognition with Multi-Level Contextual Knowledge," pp. 1-11.

Canadian Office Action, Canadian Patent Application No. 2,560,560, Feb. 5, 2008, 3 pages.

Indian Office Action, Indian Patent Application No. 1237/MUMNP/2006, Nov. 13, 2007, 2 pages.

Indian Office Action, Indian Patent Application No. 1247/MUMNP/2006, Nov. 8, 2007, 2 pages.

PCT International Search Report and Written Opinion, PCT/US06/26745, Nov. 21, 2007, 7 pages.

Office Action issued by Canadian Intellectual Property Office, Canadian Patent Application No. 2,560,560, Mar. 18, 2009, 2 pages.

First Office Action of China State Intellectual Property Office, Chinese Patent Application No. 200580013512.0, May 8, 2009, 11 pages.

First Office Action of China State Intellectual Property Office, Chinese Patent Application No. 200580013512.0, May 8, 2009, 11 Pages.

Second Office Action of China State Intellectual Property Office, Chinese Patent Application No. 200580013512.0, Oct. 23, 2009, 8 Pages.

First Office Action of China State Intellectual Property Office, Chinese Patent Application No. 200580013912.1, Aug. 28, 2009, 16 Pages.

Notice of Grounds for Rejection, Japanese Patent Application No. P2007-505107, May 18, 2010, 6 pages.

Supplementary European Search Report for European Patent Application No. EP05729642, May 12, 2010, 5 pages.

Brenner, C., et al., "Extracting Landmarks For Car Navigation Systems Using Existing GIS Databases And Laser Scanning," ISPRS Archives, Sep. 2003, 6 pages, vol. XXXIV, Part 3/W8.

Burnett, G.E., ""Turn right at the King's Head" Drivers' requirements for route guidance information," A Doctoral Thesis of Loughborough University, Nov. 1998, [online] [retrieved on Feb. 22, 2010], Retrieved from the internet <URL: http://dspace.mit.edu/handle/1721.1/14225>.

Burnett, G.E., "Turn right at the traffic lights" The requirement for landmarks in vehicle navigation systems, The Journal of Navigation, 2000, p. 499-5010, vol. 53 No. 3.

Davis, J.R., "The Back Seat Driver: Real Time Spoken Driving Instructions," IEEE, 1989, pp. 146-150.

Yamaichi, R., "We can see web business models of the Windows 2000 era! Backside of Exchange2000 (Café www.exchange2000j.com) ", BackOffice WORLD, Oct. 1, 2000, pp. 91-97 vol. 3, IDG Japan. (With English Summary).

"Paid Search" Webopedia, 2010, 1 page, can be retrieved online at <URL:www.webopedia.com/TERM/P/paid_search.html>.

"Haynes Repair Manuals" Haynes, Archived on web.archive.org on Mar. 25, 2002, 1 page, [online] [retrieved on Dec. 4, 2008] Retrieved from the internet <URL:http://web.archive.org/web/20020325061432/http://haynes.com/>.

Beis, J. S., et al., "Shape Indexing Using Approximate Nearest-Neighbour Search in High-Dimensional Spaces," CVPR '97, 1997, 7 pages.

Fei-Fei, L., et al., "Learning Generative Visual Models from Few Training Examples: An Incremental Bayesian Approach Tested on 101 Object Categories," GMBV04, 2004, pp. 1-9.

Kovesi, P., "Image Features from Phase Congruency," Videre: Journal of Computer Vision Research, 1999, pp. 1-27, vol. 1, No. 3, The MIT Press.

Lakshmi, S., "Cell Phones, Billboards Play Tag," Jul. 10, 2003, 3 pages, [online] [retrieved on May 12, 2005] Retrieved from the Internet: <URL: http://www.wired.com/news/print/0,1294,59548,00.html>.

Lowe, D. G., "Object Recognition from Local Scale-Invariant Features," Proceedings of the International Conference on Computer Vision, Sep. 1999, pp. 1150-1157.

Takeuchi, Y., et al., "Evaluation of Image-Based Landmark Recognition Techniques," The Robotics Institute, Carnegie Mellon University, CMU-RI-TR-98-20, Jul. 1998, pp. 1-16.

Viola, P., et al., "Rapid Object Detection Using a Boosted Cascade of Simple Features," Proceedings of the IEEE Conference on Computer Vision and Pattern Recognition, Dec. 2001, pp. 1-9.

Wiskott, L., et al., "Face Recognition by Elastic Bunch Graph Matching," IEEE Transactions on Pattern Analysis and Machine Intelligence, Jul. 1997, pp. 775-779, vol. 19, No. 7.

Yang, J., et al., "An Automatic Sign Recognition and Translation System," Workshop on Perceptive User Interfaces (PUI'01), Nov. 2001, 8 pages.

Zhang, J., et al., "A PDA-Based Sign Translator," Proceedings of the Fourth IEEE International Conference on Multimodal Interfaces (ICMI'02), Oct. 14-16, 2002, pp. 217-222.

PCT International Search Report and Written Opinion, PCT/US2005/016776, Aug. 23, 2005, 11 pages.

* cited by examiner

Fig. 1a

City Block (e.g., section of University Ave)

| Intersection | 200 University Ave (actual) | 180 University Ave (actual) | 170 University Ave (actual) | 168 University Ave (actual) | 164 University Ave (actual) | 100 University Ave (actual) | Intersection |

Fig. 1b

City Block (e.g., section of University Ave)

| Intersection | 200 University Ave (actual) | | | | | No physical addresses in this portion of street | 100 University Ave (actual) | Intersection |

← 180 University Ave (interpolated)
← 170 University Ave (interpolated)
← 168 University Ave (interpolated)
← 164 University Ave (interpolated)

DATABASE ASSISTED OCR FOR STREET SCENES AND OTHER IMAGES

RELATED APPLICATIONS

This application is related to U.S. application Ser. No. 11/088,542, filed Mar. 23, 2005, titled "Generating and Serving Tiles in a Digital Mapping System." In addition, this application is related to U.S. application Ser. No. 11/051,534, filed Feb. 5, 2005, titled "A Digital Mapping System." In addition, this application is related to U.S. application Ser. No. 11/181,386, filed Jul. 13, 2005, titled "Visually-Oriented Driving Directions in Digital Mapping System." Each of these applications is herein incorporated in its entirety by reference.

FIELD OF THE INVENTION

The invention relates to optical character recognition (OCR), and more particularly, to database assisted OCR for images such as street scenes.

BACKGROUND OF THE INVENTION

There is a current trend for capturing photographic data (pictures) of cities, streets, businesses, etc. These pictures are typically captured in a way that also captures GPS location and orientation (e.g., facing 67 degrees east). This data can then be used by mapping services, to enhance and augment the quality of the data being returned. For example, when returning a map of 123 University Avenue, Palo Alto Calif. 94301, street level pictures of this location can also be returned, which can significantly improve the user experience and the value of the map information returned.

One problem here is that the mapping from a GPS location to a street address, and vice versa, is not always very accurate. This problem can be traced to the way map data is collected. In general, the GPS location of certain "anchor" street addresses along a particular street is known, but addresses in-between these anchors are interpolated. As such, significant discrepancies can sometimes be observed between the actual GPS location of an address and the interpolated location. As a result, the street images shown by a mapping service for a particular address could end up being shifted by as much as 100 yards or more.

What is needed, therefore, are techniques that improve the accuracy of interpolated or otherwise estimated street address locations.

SUMMARY OF THE INVENTION

One embodiment of the present invention provides a method for assisting optical character recognition (OCR) of an image using a database. The method includes querying a database to identify at least one keyword corresponding to text expected to be in an image, and performing OCR of the image to determine if the keyword is present in the image. In one such configuration, the image is associated with known GPS location data, and the keyword(s) can be derived from information associated with the image, such as a business name, address, street name, or other descriptive information. The keywords are used to assist the OCR process in identifying text in the image. Another embodiment of the present invention further extends the above method, by determining, in response to determining that the keyword is present in the image, an actual GPS location associated with that keyword. In another such embodiment, the keyword is further associated a key event captured in the image (e.g., such as a touch down in a sub-titled/closed-captioned video image). In another such embodiment, querying the database identifies a number of textual and non-textual expected features. In this case, the method may further include performing image analysis of the image to determine if non-textual expected features are present. The image can be, for example, one of a photograph or video frame.

Another embodiment of the present invention provides a method for assisting optical character recognition (OCR) of a street scene image using a database. In this embodiment, the method includes querying a database to identify a feature expected in a street scene image of one or more street addresses, the street scene image associated with known GPS data. The method continues with performing OCR of the street scene image to determine if the expected feature is present in the street scene image. In response to determining that the expected feature is present, the method continues with determining an actual GPS location for a street address associated with that expected feature. The method may include updating the database to include the actual GPS location. In one particular case, querying the database identifies a number of textual and non-textual features. In such an embodiment, the method may further include performing image analysis of the street scene image to determine if non-textual expected features are present.

Another embodiment of the present invention provides a method for assisting optical character recognition (OCR) of a street scene image using a mapping system database. The method includes determining a target GPS location for a street scene image using known GPS data associated with that street scene image, estimating a street address of the target GPS location, and identifying a target address range based on the street address of the target GPS location. The method continues with querying a mapping system database to identify a business name having a street address in the target address range, and performing OCR of the street scene image to determine if key words associated with the identified business name are present. In response to determining that at least one key word associated with the identified business name is present, the method continues with determining an actual GPS location for the street address of that business name, based on the known GPS data. The method may include updating the mapping system database to include the actual GPS location. The method may include repeating the method for a number of additional target GPS locations. In one particular case, performing OCR of the street scene image to determine if key words associated with the identified business name are present further includes performing image analysis of the street scene image to determine if expected non-textual features associated with the identified business name are present. The street scene image can be, for example, a panoramic image that includes a plurality of street addresses. Alternatively, the street scene image (e.g., regular or panoramic) can be one street address. The known GPS data includes, for instance, known GPS locations for at least two locations captured in the street scene image. The mapping system database may include, for example, a business listings directory, and/or other digital mapping system data.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

FIG. 1b illustrates a conventional mapping system's representation of the city block shown in FIG. 1a.

DETAILED DESCRIPTION OF THE INVENTION

Optical character recognition (OCR) for images such as street scenes (e.g., storefronts) is generally a difficult problem because of the variety of fonts, styles, colors, sizes, orientations, occlusions and partial occlusions that can be observed in the textual content of such scenes. However, a database query can provide useful information that can assist the OCR process.

For instance, a query to a digital mapping database can provide information such as one or more businesses in a vicinity, the street name, and a range of possible addresses. In accordance with an embodiment of the present invention, this mapping information is used as prior information or constraints for an OCR engine that is interpreting the corresponding street scene. The result of the OCR process can also be used to refine or otherwise update the mapping system database, particularly if the GPS location and orientation where the picture was taken is known. The result is much greater accuracy of the digital map data provided to the user.

Example Application

Figure 1A:
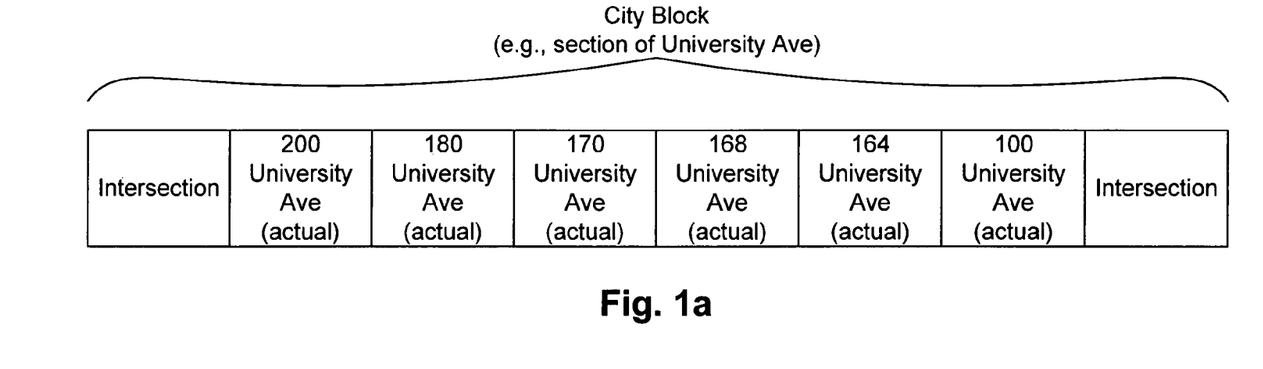
FIG. 1a illustrates a typical city block that includes a number of physical addresses.

Consider the following example shown in FIG. 1a, which shows a typical city block (University Ave) that includes a number of addresses, ranging from 100 to 200, and their actual locations. This range of addresses are included between two intersections, as are most city blocks. An image of the entire city block could be captured, for example, in a panoramic photograph. Other features typically found in such a city block scene, such as parked cars, curb, sidewalk, trees and planters, retaining walls, glass storefronts, signage, addresses, etc may also be included in a given city block. Note that the use of terms such as "city block" and "intersection" is not intended to exclude other streets that include a range of addresses, whether residential or commercial.

Figure 1B:
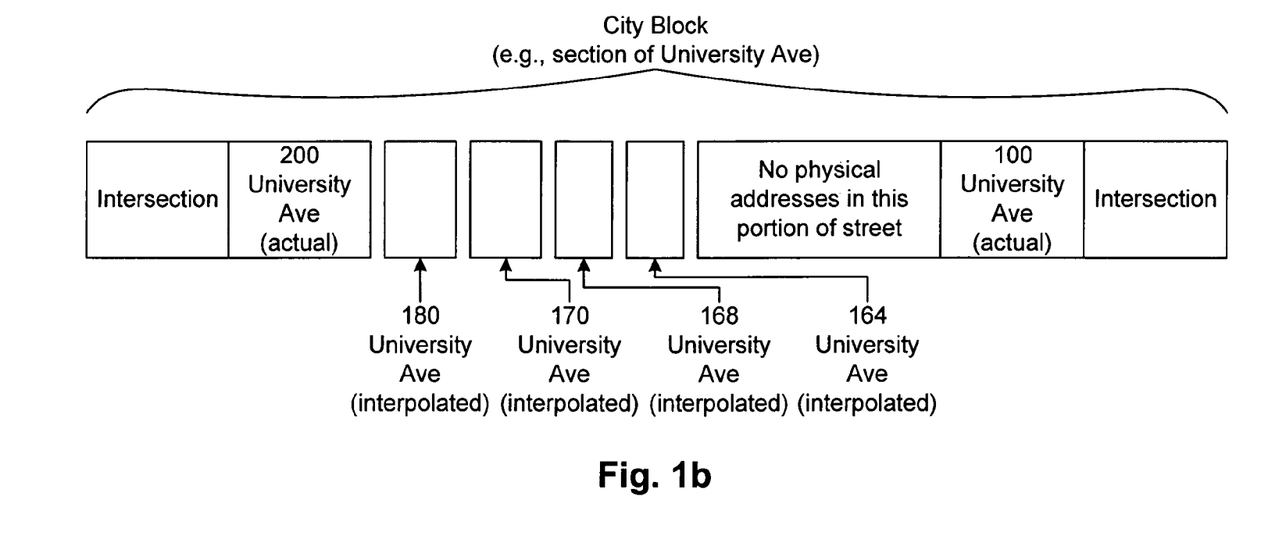

FIG. 1b illustrates a conventional mapping system's representation of the city block shown in FIG. 1a. An underlying digital map system database (e.g., Navteq) has an actual GPS location for 100 University Ave and 200 University Ave. Assume only one side of the street is being considered. In conventional mapping systems, the addresses between 100 and 200 University Ave. are typically interpolated by dividing the city block equally.

However, a common situation is where there are only a few addresses between the anchor address of 100 and 200 (e.g., 180, 170, 168, and 164, as shown in FIG. 1a). So, when querying the database for an address such as 102 University Avenue, one will get a map image location very close to 100 (based on even address distribution). In actuality, however, 102 University Avenue could be as much as halfway between the anchor addresses of 100 University Ave and 200 University Ave, or closer to 200 University Ave than to 100 University Ave. Indeed, in this example, there is no 102 University Avenue.

In more detail, and with reference to FIGS. 1a and 1b, a first street intersection is at 100 University Ave and a second intersection is at 200. Significantly, there are no street numbers between 100 University Ave and 164 University Ave in this example. Thus, if the GPS location of the store (or other structure) at 164 University Ave is interpolated using conventional techniques (based on its street address), it would be placed far to the left of its actual location, as shown in FIG. 1b.

As such, the user may be confused or otherwise have a difficult time when attempting to actually locate 164 University Ave. This problem is exacerbated on longer streets and streets that have one or more breaks in the middle. In the latter case, it is possible that the returned map data provided to the user could send the user to the wrong section of the street. If the user does not know that the street continues after a break (e.g., to allow for a park or large campus), then that user may conclude that the target street address does not actually exist.

As will be apparent in light of this disclosure, database assisted OCR can be used to significantly improve this situation. For instance, assume a collection of images or photographs taken between 100 University Ave and 200 University Ave are available. Alternatively, assume a wide panorama image showing the entire city block between 100 and 200 University Ave is available. In any such case, a significant amount of existing database information is known about the images. For instance, a mapping database (e.g., Navteq or Google Local) would indicate that the street numbers are all even numbers ranging in numerical order between 100 and 200. Furthermore, actual street numbers are known. In addition, business names at these addresses are known, as well as the order that these businesses occur along the street.

This existing database information can be used as a set of constraints for an OCR engine specifically trained to work on city scenes. For example, a list of constraints (such as the mentioned existing database information) could be used by an OCR engine to reduce the problem to word spotting (i.e., is this word or number detected in this image?). Alternatively, or in addition to, Hidden Markov Models (HMM) and other statistical approaches can be used to provide a set of constraints, as used in OCR applications such as forms recognition.

Through such a constrained OCR approach, a much refined mapping from street addresses to GPS locations is provided. Numerous benefits can be realized, including refinement of the underlying database (e.g., Navteq), and improved user experience (the right images would be displayed for each street address). In addition, this approach as described herein could be used as a more efficient and cost-effective process to collect Navteq-type data. Note that this approach is not limited to digital pictures and mapping systems but could also be used for video data, or panorama images of the style currently produced for the CityBlock Project at Stanford University.

System Architecture

Figure 2:
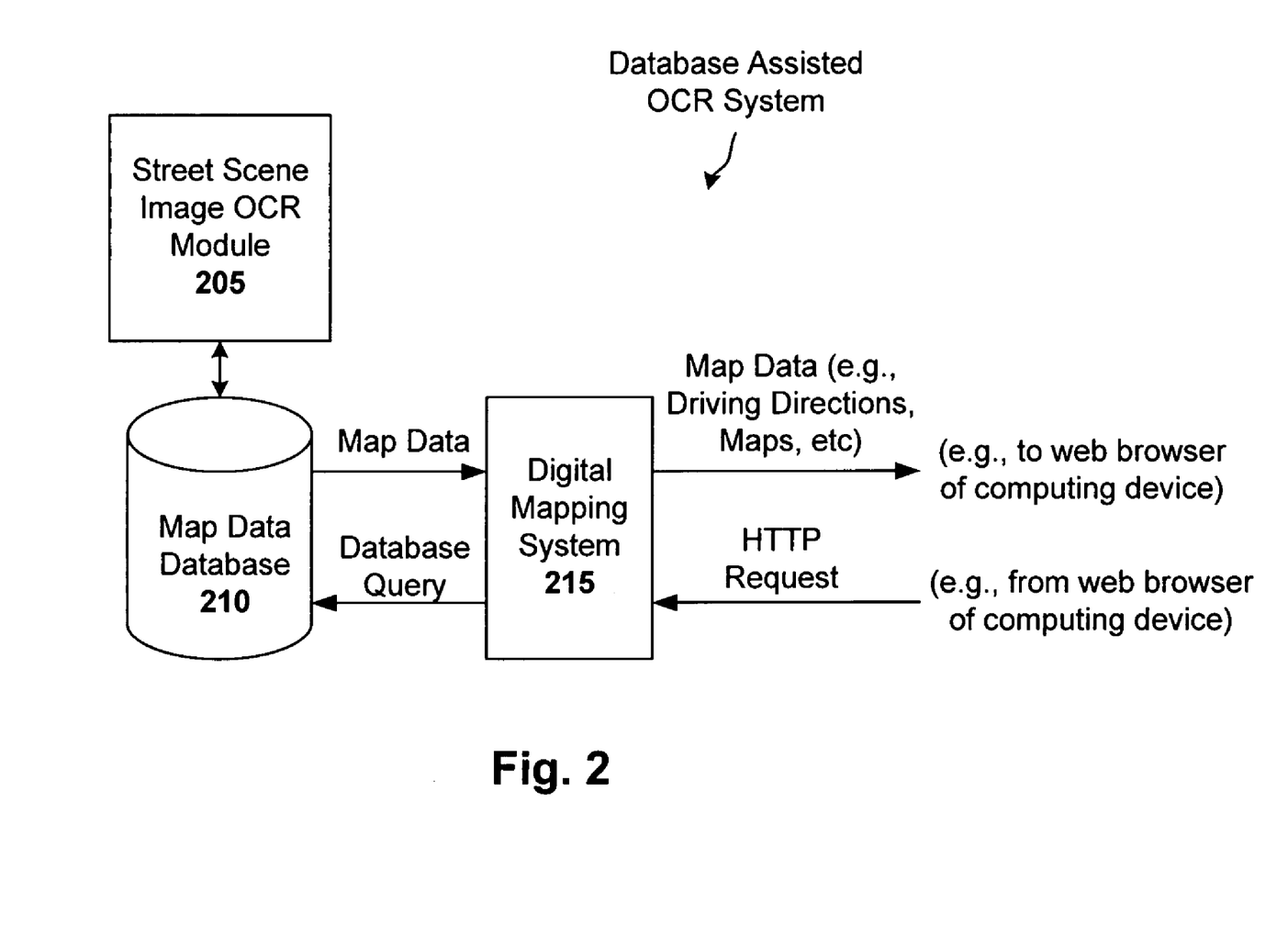
FIG. 2 is a block diagram of a database assisted OCR system configured in accordance with one embodiment of the present invention.

FIG. 2 is a block diagram of a database assisted OCR system configured in accordance with one embodiment of the present invention. As can be seen, the system includes a street scene image OCR module 205, a map data database 210, and a digital mapping system 215.

In the embodiment shown in FIG. 2, the database assisted OCR system operates in both an off-line capacity, as well as in an on-line capacity. In particular, OCR results are generated by the street scene image OCR module 205 in an off-line process, and can be used to refine/update the map data in database 210. This off-line process effectively improves the accuracy of map data in the database 210, by removing errors associated with address interpolation and other techniques for estimating address locations on a given street, as previously discussed. The structural and functional details of the street scene image OCR module 205 are discussed in more detail with reference to FIGS. 3 and 4.

During on-line operations, requests (e.g., HTTP) for map data (e.g., written and graphical driving directions, maps, local data, etc.) are received by the digital mapping system 215. The request can be initiated, for example, by a user engaging a web browser of a computing device to access the system. In response to such a client request, the digital mapping system 215 accesses the map data database 210 and integrates the relevant map data into the response to the request. This map data can then be served to the requestor via a network (e.g., Internet or local area network) and web browser of the requestor's computing device.

The digital mapping system 215 can be implemented with conventional or custom technology. The map data database 210 can also be implemented with conventional or custom technology (e.g., for storing Navteq and/or Google Local map data). In one particular embodiment, the digital mapping system 215 and map data database 210 are implemented as described in the previously incorporated U.S. application Ser. No. 11/088,542. The remote client (not shown) receives the requested graphical map data, and requests any map tiles it doesn't already have displayed or cached (e.g., as explained in the previously incorporated U.S. application Ser. No. 11/051,534). When the tiles are received from the server side of the digital mapping system, the client draws and displays the map, along with the driving directions. The client side can also be used to draw (e.g., overlay) graphical driving directions, location markers, etc on the map image. However, the present invention is not intended to be limited to systems that provide tile-based maps. Rather, embodiments of the present invention can also be used with other mapping systems, such as non-tile vector-based and raster-based mapping systems. Still other embodiments of the present invention can be used to provide database assisted OCR for applications other than digital mapping systems.

For instance, consider a system for analyzing video that includes sub-titles (including closed-captioning). In this embodiment, the database for assisting the OCR process would include the sub-titles for each frame of video (and other textual information, such as "laughter" or "explosion"). Here, the OCR engine would be constrained, for example, to look for sub-titled dialog in the frames of video. Once the OCR process identifies the target sub-titled text, the frame and/or time associated with that text could be noted. Such an application might be useful, for example, in the context of a smart video playback system. In more detail, assume a sports fan that has video recorded the broadcast of a game with closed-captioning enabled (to textually capture the commentary). A playback system configured in accordance with an embodiment of the present invention would include a database storing the commentary transcript of the game, or an even more refined data collection, such as a set of key event terms (e.g., "touch down," "home run," "goal," "score," "unsportsmanlike conduct," "$4^{th}$ and goal," "punt," "double play," "interception," etc). An OCR engine would then search for the transcript text or key event terms (or other expected features) in the frames of sub-titled video. Transcript pages or key events could then be correlated to video frames for quick reference. The smart video playback system could then be trained to only play frames leading up to (and just after) the frames where a significant event occurred.

Street Scene Image OCR Module

Figure 3:
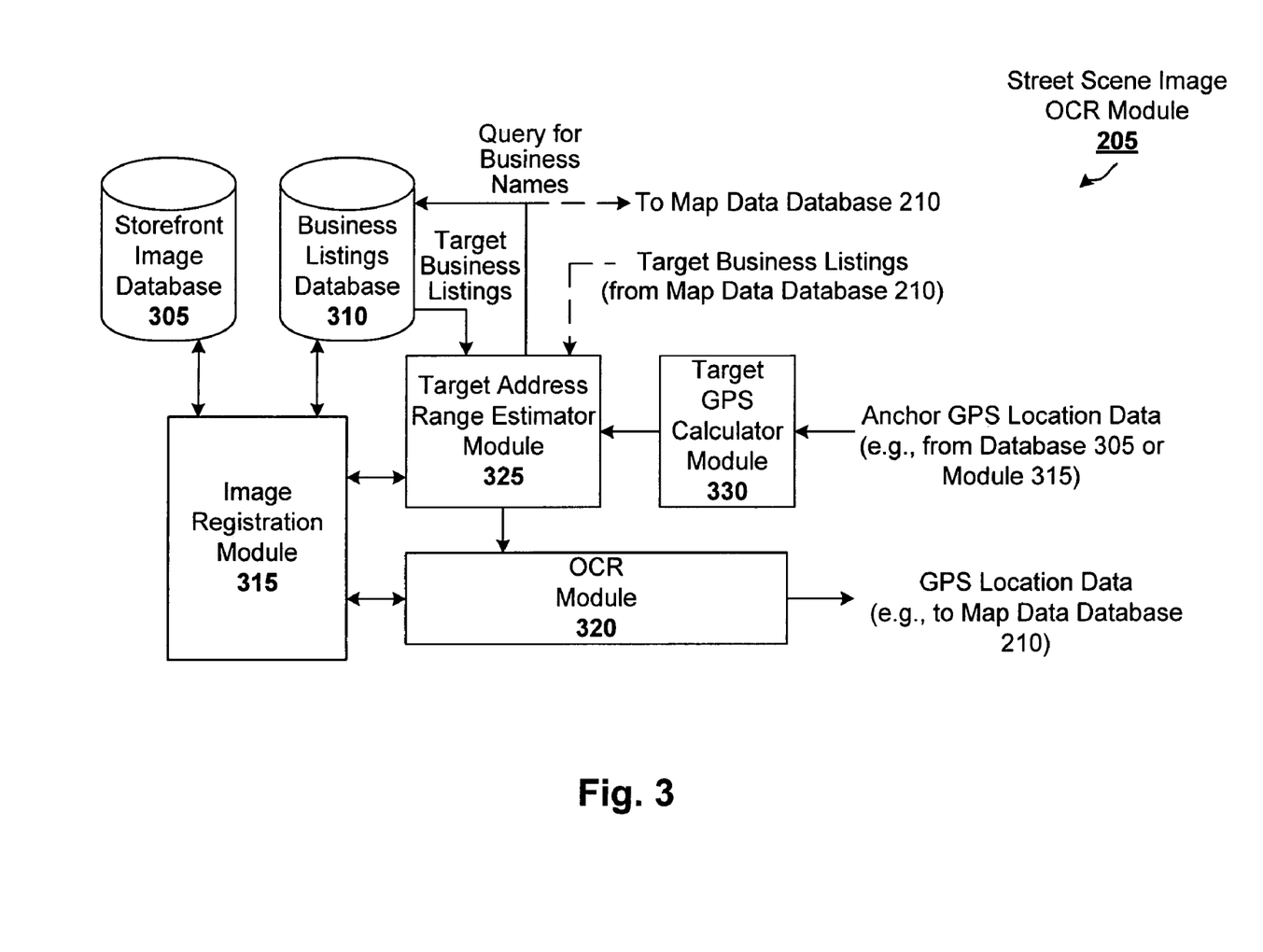
FIG. 3 is a block diagram of the street scene image OCR module shown in FIG. 2, configured in accordance with one embodiment of the present invention.

FIG. 3 is a block diagram of the street scene image OCR module 205 shown in FIG. 2, configured in accordance with one embodiment of the present invention. The module 205 performs database assisted OCR, the results of which can then be used to update the map data database 210. The database 210 can then be accessed by, for example, the digital mapping system 215 as previously discussed. Note, however, that the street scene image OCR module 205 can be used with other applications, as will be understood in light of this disclosure. Generally, any image analysis can benefit from using database assisted OCR.

As can be seen, the module 205 includes a storefront image database 305, a business listings database 310, an image registration module 315, an optical character recognition (OCR) module 320, a target address range estimator module 325, and a target GPS calculator module 330. Numerous variations on this configuration for performing database assisted OCR will be apparent in light of this disclosure, and the present invention is not intended to be limited to any one such embodiment.

In operation at preprocessing time (off-line), the street scene image OCR module 205 employs one or more databases of street scene images (e.g., storefront image database 305), together with one or more corresponding databases of business listings (e.g., business listings database 310) and/or map data databases (e.g., map data database 210). Each database can be structured to facilitate efficient access of data, and include various types of information. For example, each street-level image (e.g., digital photograph taken using a GPS-enable camera) stored in the storefront image database 305 can be indexed by geocode, and associated with corresponding GPS coordinates. The business listings database 310 and map data database 210 can be structured, for example, as conventionally done.

In an alternative embodiment, the illustrated databases are integrated into a single database that is accessed to assist the OCR process. Also, other databases or information sets could be included, such as a conventional residential listings (e.g., white pages directory) database or other such listing service databases. Further note that the image databases may include multiple views and/or zoom levels of each photographed area. For instance, one storefront image can be taken from an angle as it would be seen from one direction of the street (e.g., traveling north), while another storefront image of the same address could be taken from an angle as it would be seen from the other direction of the street (e.g., traveling south). Thus, depending on the driving direction route, either image could be used.

The storefront image database 305 can store different kinds of images. In one example embodiment, there are two primary modes in which the system 205 can operate: mode 1 and mode 2. Either mode can be used, or a combination of the modes can be used.

Mode 1 uses panoramic images, where a single panoramic image captures multiple street addresses (e.g., one city block, or a string of contiguous address locations on a street), such as shown in FIG. 1*a*. Such panoramic pictures can be taken, for example, using a panoramic camera or a regular camera equipped with a panoramic lens. In this mode, the GPS coordinates at every point along the picture is known or can be accurately calculated. For instance, given a panoramic picture corresponding to the block of 100 to 200 University Ave shown in FIG. 1*a*, where the GPS location at either end of the block are known (e.g., based on GPS receiver data taken at same time of image capture), then the GPS coordinates can be calculated at every point along the way using linear interpolation. Thus, GPS coordinates can be determined for each corresponding address location in the panoramic image with reasonable accuracy (e.g., +/−1 to 2 meters).

If so desired, exact GPS coordinates of every pixel or vertical line in a panoramic image can be known. In more detail, a differential GPS antenna on a moving vehicle can be employed, along with wheel speed sensors, inertial measurement unit, and other sensors, which together, enable a very accurate GPS coordinate to be computed for every pixel in the panorama. However, such high accuracy is not required. As long as GPS coordinates at some regularly sampled points (such as street corners) are known, sufficiently accurate GPS coordinates of locations in-between could be interpolated, as previously discussed.

Mode 2 uses more traditional imagery, such as digital pictures taken with regular digital cameras, or any camera that generates images upon which OCR can be performed (e.g., disposable cameras). In this mode, a single set of GPS coordinates is known for each picture, corresponding to the exact location where each picture was taken. Each picture corresponds to one particular street address. Thus, given a series of such picture/GPS data pairs, exact GPS coordinates are known for each corresponding address location on that street. Alternatively, the end pictures of a series can be associated with known GPS data, so that the GPS data for the in-between addresses can be estimated with reasonable accuracy.

The image registration module 320 is programmed or otherwise configured to construct a mapping between images and business listings. In one embodiment, this mapping is accomplished by a combination of image segmentation using standard image-processing techniques (e.g., edge detection, etc.) and interpolation of a business's street address within the range of street addresses known to be contained in the image. Image registration can be done for the street scene images stored in the storefront image database 305, and any other images that can be used in the OCR image analysis process (e.g., such as satellite images). The mapping can be implemented, for example, with a pointer or address scheme that effectively connects images from an image database to listings in the business listings database. Alternatively, a single database can be built as the image registration process is carried out, where the records of the single database are indexed by geocode and/or GPS coordinates, and each record includes image data and related business listings information.

In the embodiment shown, image processing (e.g., OCR) is performed by accessing the images by way of the image registration module 315 (e.g., which can access the images stored in the database 305 using a pointer or addressing scheme). Other embodiments can access the images directly from their respective databases. In any case, once a target address range is known, images associated with that range can be identified and subjected to image processing using the OCR module 320, to determine actual GPS location data for each of the addresses detected in the images.

The target address range provided to the OCR module 320 can be determined using the target GPS calculator module 330 and the target address range estimator module 325. In more detail, actual GPS location data associated with a particular image is provided to the target GPS calculator module 330 from, for example, the storefront image database 305 or the image registration module 315. This actual GPS location data can be, for instance, known GPS data associated with two anchor points of an image (e.g., such as discussed with reference to 100 and 200 University Ave of FIG. 1a). Alternatively, the actual GPS location data can be, for instance, known GPS location data associated with each of two single address images that have a number of addresses between them.

In any such case, when two actual GPS coordinates are known, the target GPS calculator module 330 can use that known GPS data to calculate any in-between GPS data. For instance, a target GPS location ($GPS_{target}$) at the midpoint between two known actual GPS locations ($GPS_1$ and $GPS_2$) can be calculated using linear interpolation (e.g., $GPS_{target} = [|GPS_1 - GPS_2|/2] + GPS_1$). This is particularly useful for panoramic images that include multiple address locations between two anchor points (as is the case sometimes in mode 1). Likewise, this calculation is useful for a contiguous series of single address images, where only the images at that beginning and end of the series have GPS location data (as is the case sometimes in mode 2). In short, if the actual target GPS location data is not known, it can be interpolated or otherwise calculated based on known GPS location data. If the target GPS location data is already known, then no calculation by module 330 would be necessary.

The target GPS location data (whether previously known or calculated by module 330) is then provided to the target address range estimator module 325, which uses the target GPS location data to estimate a target address range. For instance, the target GPS location data can be used to identify a corresponding address in a table lookup operation (e.g., of database 305 or module 315). Once the corresponding address is identified, the business listings database 310 can be queried to return a number (e.g., 10) of addresses before that corresponding address, and a number (e.g., 10) of addresses after that corresponding address, so as to provide a range of target addresses. Alternatively (or in addition to), the map data database 210 can be queried to return the set of addresses before that corresponding address, and the set of addresses after that corresponding address, so as to provide the range of target addresses.

In another embodiment, the target address range estimator module 325 can estimate the target address range using interpolation. For example, if the target address is somewhere in the middle of the city block shown in FIG. 1a, then that target address can be interpolated or otherwise estimated (e.g., [100+200]/2=150). Then an address tolerance can be assigned (e.g., +/−20). Thus, in this example, the target address range would be addresses 130 to 170 on University Ave.

In any case, once the target address range is determined, then the available databases can be queried to provide information that can be used to constrain the OCR process. For instance, the business listings database 310 can be queried to identify the store names at the addresses included in the target address range. Alternatively, the map data database 210 can be queried to identify the store names at the addresses included in the target address range. Alternatively, both databases 210 and 310 can be queried to identify the store names, and the results can then be cross-checked for correlation and to identify business names missing from one of the databases. Each of these results can be used an expected feature for constraining the OCR process.

The OCR module 320 can now be applied to the storefront image or images to read the storefront signage (if any) and other readable imagery, using OCR algorithms and techniques as further improved by the present invention. As previously explained, the OCR process can be constrained based on the query results of the databases 205 and/or 310. In one particular embodiment, the OCR module 320 is constrained by the business names returned from the database query or queries. For instance, the OCR module 320 can be constrained to look for text such as "McDonalds," "Fry's Electronics," "H&R Block," and "Pizza Hut." The OCR module 320 can also be constrained, for example, by identifying the type of store or stores in the target address range, based on the corresponding category listings in the business listings database 310 (e.g., "bars and restaurants" or "flowers" as done in a conventional yellow pages directory). Recall that the image registration module 315 has already mapped the images to corresponding listings within the business listings database 310, thereby facilitating this context identification for the OCR process. In addition, text related to that business listings category can be obtained, for example, by accessing web sites of stores in that category, and adjusting the language model used for OCR module 320, accordingly. This supplemental information from the map database 210 and/or business listings database 310, and/or websites enables the OCR module 335 to be further informed of the context in which it is operating (in addition to knowing the store names for which it is searching).

In one particular configuration, the constrained OCR search can be carried out using a template matching technique. In more detail, for each expected feature to be used for a given image, at least one identification template is generated. The identification templates can be bitmaps, vectors, splines, or other representations of the expected feature. For any given expected feature, a number of different templates can be constructed in various font types, or font sizes, or font styles. Further, where the expected feature has a predetermined and consistently used font style, shape, or other form (e.g., the specific font used for "McDonald's"), then this font is used for the generation of the identification templates. As the OCR module processes the image, image features are compared with at least one of the identification templates. The OCR module then uses the results of the comparison to make the OCR determination.

For instance, suppose that one of the candidate words being searched for in an image is "165". In this case, a number of bitmap renditions of "165" could be generated at various scales and using various fonts to form the identification templates. Then, features of the image could be compared to the renditions, to see if that numerical pattern was in the image. Such approaches work particularly well, for example, for identifying street numbers, where the range of fonts is relatively limited. There are numerous such template matching approaches that can be used, as will be apparent in light of this disclosure. Along the same lines, another way to constrain the OCR is by using a "digits only" lexicon or language pack. This limits the search to street numbers only (or other numeric patterns), but because of the constraint introduced, greater accuracy is achieved. In one such embodiment, the image can be binarized using, for example, the Niblack approach (e.g., Wayne Niblack, An Introduction to Image Processing, Prentice-Hall, Englewood Cliffs, NJ, 1986, pp. 115-116, which is herein incorporated in its entirety by reference), and then running a commercial OCR package (e.g., Abbyy FineReader) with a digits-only lexicon. Other such image processing techniques can be used as well.

In addition to OCR, the OCR module 335 can also be programmed or otherwise configured to further analyze storefront images. In one embodiment, this supplemental image analysis is carried out at both a coarse level (e.g., width, height, color histograms) and a more refined level (e.g., segmentation into facade, doors, windows, roof, architectural elements such as pillars and balconies; decorative elements such as awnings, signage, neon lights, painted designs). Such analysis can carried out, for example, using standard image-processing techniques (e.g., computer vision). Standard feature extraction algorithms typically extract high level information from images, such as shapes, colors, etc. Pattern recognition algorithms can then be applied to classify the extracted information so as to "recognize" objects in the storefront images. The patterns and other features identified during this supplemental image analysis may be helpful, for instance, where a particular storefront indicated in an image does not include any helpful text that can be identified by OCR processing.

For instance, the supplemental image analysis can be used to identify trade dress and logos. In more detail, the image processing constraints provided from the databases 210 and/or 310 might include store names (e.g., McDonalds and Pizza Hut) as well as known trade dress and logos corresponding to those store names (e.g., Golden Arches for McDonalds and the unique-shaped red roof for Pizza Hut). Thus, the OCR module 320 can be looking for "McDonalds" and "Pizza Hut", while supplemental image analysis can be looking for the Golden Arches and the unique red roof design. Note that the supplemental image analysis can be programmed into the OCR module 320, or can exist independently as a distinct module. The various types of image analysis can be carried out in parallel, if so desired.

Once the OCR module 320 identifies targeted features (e.g., business names and/or other targeted text, symbols, colors, graphics, logos, etc) in the image, then the known GPS coordinate(s) associated with that image can then be assigned to the corresponding addresses determined by the target address range estimator module 325. As such, each address captured in the image will now have actual GPS coordinates (as opposed to interpolated or otherwise estimated). This actual GPS location data can then be integrated into the map data database 210 (or other databases) to further improve its accuracy.

Thus, efficient and effective OCR on images of natural scenes is enabled. This efficiency and effectiveness is derived from constraints learned from database queries to one or more databases or other information stores (e.g., websites). Numerous variations and applications will be apparent in light of this disclosure. One such application is to use database assisted OCR techniques described herein to implement or otherwise complement a digital mapping system, such as the one described in the previously incorporated U.S. application Ser. No. 11/181,386, thereby enabling the service of highly accurate and visually-oriented driving directions.

Methodology

Figure 4:
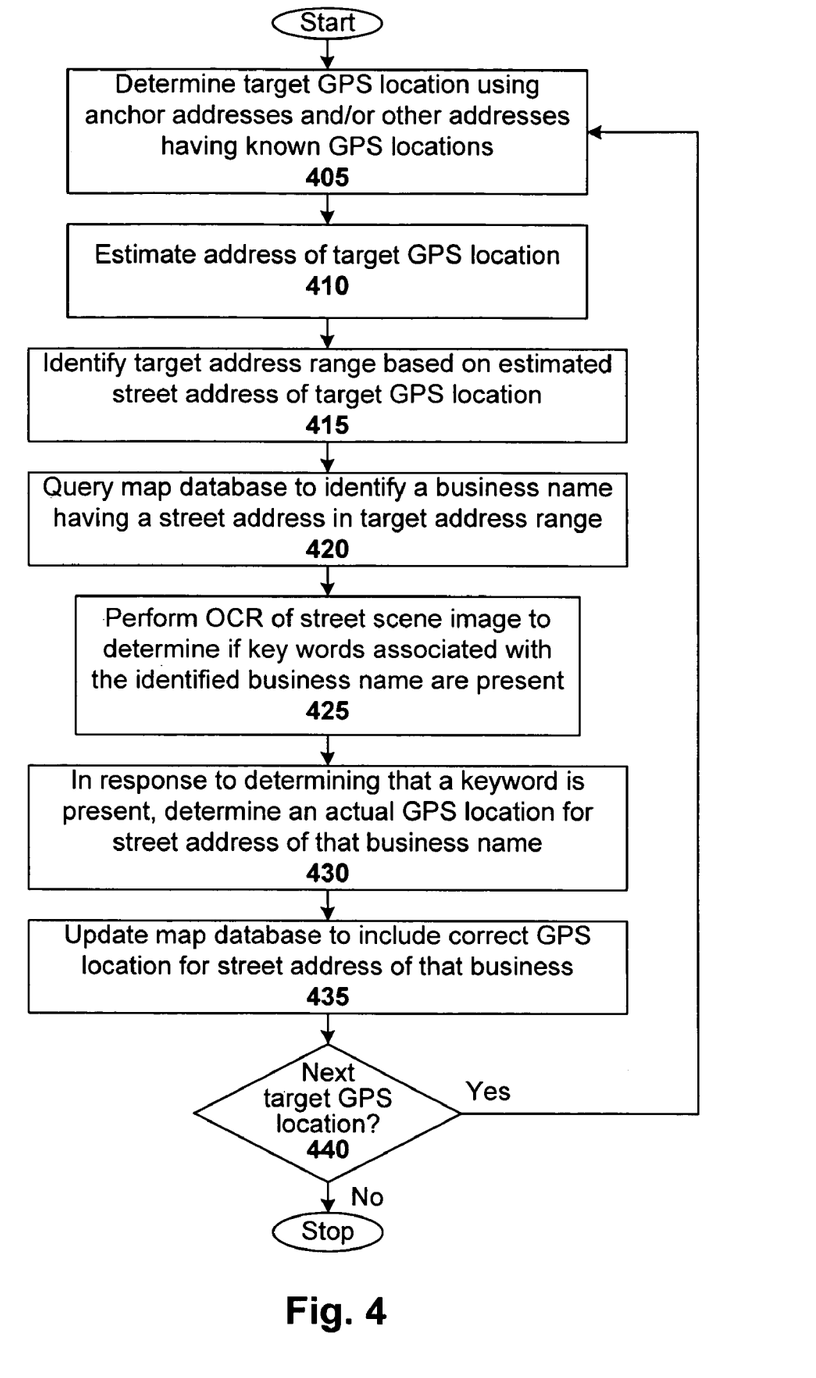
FIG. 4 illustrates a method for assisting optical character recognition of street scene images using a mapping system database, in accordance with one embodiment of the present invention.

FIG. 4 illustrates a method for assisting optical character recognition of street scene images using a mapping system database, in accordance with one embodiment of the present invention. The method can be carried out, for example, using the street scene image OCR module 205 of FIGS. 2 and 3, although other implementations will be apparent in light of this disclosure.

For this example, assume a street scene image being analyzed includes a number of address location, including two address locations having known GPS locations, with some address locations therebetween having unknown GPS locations. The method begins with determining 405 a target GPS location using anchor addresses and/or other addresses having known GPS locations, as previously explained (e.g., $GPS_{target}=[|GPS_1-GPS_2|/2]+GPS_1$). Note that this equation can be repeated a number of times to find multiple target GPS locations (e.g., $GPS_{target1}=[|GPS_1-GPS_2|/2]+GPS_1$; $GPS_{target2}=[|GPS_1-GPS_{target1}|/2]+GPS_1$; $GPS_{target3}=[|GPS_1-GPS_{target2}|/2]+GPS_1$). The resolution of calculated target GPS locations will depend on the particular street being analyzed. In one embodiment, a GPS location is calculated for every 3 meters of the actual street.

The method continues with estimating 410 an address of the target GPS location (e.g., [100+200]/2=150, with respect to the University Ave example of FIG. 1a). Address interpolation or other suitable estimating techniques can be used to estimate the address. The method continues with .identifying 415 a target address range based on estimated street address of target GPS location (e.g., 150+/−20). This target address range can be used for searching in the map database (or other appropriate database) to provide OCR constraints.

The method continues with querying 420 the map database to identify business names having a street address in target address range. The method continues with performing 425 OCR of the street scene image to determine if key words (and/or other descriptive features, as previously explained) associated with the identified business names are present.

In response to determining that a keyword is present, the method continues with determining 430 an actual GPS location for the street address of that particular business name (as indicated by detected the keywords). The method continues with updating 435 the map database to include the correct GPS location for the street address of that business. The method then continues with determining 440 if there are more target GPS locations to analyze. If so, then the method repeats for each particular target GPS location. If there are no more target GPS locations to analyze, then the method concludes.

Variations on this embodiment will be apparent in light of this disclosure. For instance, another embodiment is a method. for assisting OCR of an image using a database of expected keywords (and/or other expected data). Here, the method includes querying the database (any storage facility) to identify at least one keyword corresponding to text expected to be in an image, and performing OCR of the image to determine if the keyword is present in the image. As an alternative to OCR (or in addition to OCR), image analysis may be performed to identify if expected non-textual features retrieved from the database are included in the image.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A method for constructing a database storing one or more street scene images, each street scene image associated with GPS location data identifying an actual location of the street scene image, the method executed by a computer system and comprising:

storing in the database of the computer system, a plurality business names, each business name associated with a street address and one or more keywords;

estimating a street address for a street scene image of the street scene images using the GPS location data associated with that street scene image;

identifying a target address range based on the estimated street address;

querying the database to identify a business name associated with a street address in the target address range and to identify the one or more keywords associated with the identified business name;

performing optical character recognition of the street scene image to recognize text contained in the street scene image, wherein the optical character recognition of the street scene is constrained by at least one of the identified keywords resulting from querying the database;

determining if the recognized text contained in the street scene image corresponds to at least one of the identified keywords;

updating the estimated street address in the database including the GPS location data in response to a determination that the recognized text corresponds to at least one of the identified keywords.

2. The method of claim 1, further comprising performing image analysis of the street scene image to determine if features associated with the identified business name are present in the street scene image.

3. The method of claim 1 wherein the street scene image includes one street address.

4. The method of claim 1 wherein the street scene image is a panoramic image that includes a plurality of street addresses.

5. The method of claim 1 wherein the database includes a business listings directory.

6. The method of claim 1, wherein estimating the street address for the street scene comprises determining a target GPS location for the street scene image using GPS data associated with that street scene image.

7. The method of claim 6 wherein the GPS data includes GPS locations for at least two locations captured in the street scene image.

8. A method for performing image analysis of a street scene image, the street scene image associated with GPS location data identifying an actual location of the street scene image, the method executed by a computer system, and comprising:

querying a database comprising a plurality of street addresses, each street address associated with image features, to identify an image feature that is present in a street scene image of a street address, the street scene image comprising a plurality of address locations and at least two of the plurality of address locations having known GPS data;

performing image analysis of the street scene image to recognize features in the street scene image, wherein the image analysis of the street scene is constrained by the identified image feature from querying the database, and the identified image feature is associated with a street address from the database;

determining if the recognized features in the street scene image correspond to the identified image feature associated with the street address from the database; and in response to determining that the recognized features correspond to the identified image feature associated with the street address from querying the database, updating the street address in the database including the GPS location data.

9. The method of claim 8 wherein querying the database identifies a number of textual and non-textual features.

10. The method of claim 9 further comprising:

performing image analysis of the street scene image to determine if non-textual features are present.

11. The method of claim 8 wherein the street scene image includes one street address.

12. The method of claim 8 wherein the street scene image is a panoramic image that includes a plurality of street addresses.

13. The method of claim 8 wherein the known GPS data includes known GPS locations for at least two locations captured in the street scene image.

14. A method for performing optical character recognition (OCR) of an image, the image associated with GPS location data identifying an actual location of the image, the method executed by a computer and comprising:
  storing in a database a plurality of images, each image associated with one or more keywords;
  querying the database to select at least one image;
  performing optical character recognition of the selected image to recognize text that may be contained in the image, wherein the optical character recognition of the image is constrained by at least one of the keywords associated with the image in the database;
  determining if the recognized text contained in the image corresponds to the at least one of the keywords associated with the image; and
  in response to determining that the recognized text contained in the image corresponds to at least one of the keywords associated with the image, updating a street address to be associated with the GPS location data, the street address being associated with the image.

15. The method of claim 14 wherein the keyword is further associated with a street address or a key event.

16. The method of claim 14 wherein querying the database identifies a number of textual and non-textual features that is in the image.

17. The method of claim 16 further comprising:
  performing image analysis of the image to determine if non-textual features are present.

18. The method of claim 14 wherein the image is one of a photograph or video frame.

19. The method of claim 14 wherein the image is associated with GPS location data, and in response to determining that the keyword is present, determining an actual GPS location associated with that keyword.

20. A computer program product, comprising a computer-readable storage medium containing computer executable instructions for controlling a computer system to perform the operations of:
  storing in a database of the computer system a plurality of business names, each business name associated with a street address and one or more keywords;
  estimating a street address for a street scene image using data associated with that street scene image, the street scene image associated with GPS location data identifying an actual location of the street scene image;
  identifying a target address range based on the estimated street address of the target GPS location;
  querying the database with the target address range to identify a business name associated with a street address in the target address range and to identify the one or more keywords associated with the identified business name;
  performing optical character recognition of the street scene image to recognize text contained in the street scene image, wherein the optical character recognition of the street scene is constrained by at least one of the identified keywords resulting from querying the database;
  determining if the recognized text contained in the street scene image corresponds to at least one of the identified keywords;
  updating the estimated street address including the GPS location data in response to a determination that the recognized text corresponds to at least one of the identified keywords.

21. The computer program product of claim 20, further comprising performing image analysis of the street scene image to determine if features associated with the identified business name are present in the street scene image.

22. The computer program product of claim 20, wherein the street scene image is a panoramic image that includes a plurality of street addresses.

23. The computer program product of claim 20, wherein the GPS data includes GPS locations for at least two locations captured in the street scene image.

24. The computer program product of claim 20, wherein the database includes a business listings directory.

25. The computer program product of claim 20, wherein the computer executable instructions for estimating the street address for the street scene further comprises computer executable instructions for determining a target GPS location for the street scene image using GPS data associated with that street scene image.

26. A computer program product, comprising a computer-readable storage medium containing computer executable instructions for controlling a computer system to perform the operations of:
  querying a database comprising a plurality of street addresses, each street address associated with image features, to identify an image feature that is present in a street scene image of a street address of the street addresses, the street scene image comprising a plurality of address locations and at least two of the plurality of address locations having known GPS data;
  performing image analysis of the street scene image to recognize features in the street scene image, wherein the image analysis of the street scene is constrained by the identified image feature from querying the database, and the identified image feature is associated with a street address from the database;
  determining if the recognized features in the street scene image correspond to the identified image feature associated with the street address from the database; and
  in response to determining that the recognized features correspond to the identified image feature associated with the street address from querying the database, updating the street address in the database including GPS location data associated with GPS location data, the GPS location data identifying an actual location of the street stress.

27. The computer program product of claim 26, wherein querying the database identifies a number of textual and non-textual features.

28. The computer program product of claim 27 further comprising:
  performing image analysis of the street scene image to determine if non-textual features are present.

29. A computer program product, comprising a computer-readable storage medium containing computer executable instructions for controlling a computer system to perform the operations of:
  storing in a database a plurality of images, each image associated with one or more keywords and GPS location data identifying an actual location of the image;
  querying the database to select at least one image;
  performing optical character recognition of the selected image to recognize text that may be contained in the image, wherein the optical character recognition of the image is constrained by at least one of the keywords associated with the image in the database;
  determining if the recognized text contained in the image corresponds to the at least one of the keywords associated with the image; and
  in response to determining that the recognized text contained in the image corresponds to at least one of the keywords associated with the image, updating a street address in the database to be associated with the GPS data, the street address being associated with image.

30. The computer program product of claim 29 wherein the keyword is further associated with a street address or a key event.

31. A computer system for constructing a database storing one or more street scenes, each street scene image associated with GPS location data identifying an actual location of the street scene image, comprising:
   a database storing a plurality of business names and street addresses, each business name associated with a street address of the street addresses and one or more keywords;
   a target address range estimator module coupled to the database and adapted to:
      estimate a street address of the street addresses for the street scene image using data associated with that street scene image;
   a target GPS calculator module coupled to the target address range estimator module and adapted to identify a target address range based on the estimated street address of the target GPS location;
   an image registration module coupled to the database and the target address range estimator module and adapted to query the database to identify a business name associated with a street address in the target address range and to identify the one or more keywords associated with the identified business name;
   an optical character recognition module coupled to the target address range estimator module and the image registration module and adapted to:
      perform optical character recognition of the street scene image to recognize text contained in the street scene image, wherein the optical character recognition of the street scene is constrained by at least one of the identified keywords resulting from querying the database; and
      determining if the recognized text contained in the street scene image corresponds to at least one of the identified keywords; and
   the image registration module adapted to update the estimated street address in the database including the GPS location data in response to a determination that the recognized text corresponds to at least one of the identified keywords.

32. The computer system of claim 31, wherein the target address range estimator is further adapted to determine a target GPS location for the street scene image using GPS data associated with that street scene image.

33. A computer system for performing image analysis of a street scene image using a database, the street scene image associated with GPS location data identifying an actual location of the street scene image, comprising:
   an image registration module adapted to query the database comprising a plurality of street addresses, each street address associated with image features, to identify an image feature that is present in the street scene image of the street address, the street scene image comprising a plurality of address locations and at least two of the plurality of address locations having known GPS data;
   an optical character recognition module coupled to the image registration module and adapted to:
      perform image analysis of the street scene image to recognize features in the street scene image, wherein the image analysis of the street scene is constrained by the identified image feature from querying the database, and the identified image feature is associated with the street address from the database; and
      determine if the recognized features in the street scene image correspond to the identified image feature associated with the street address from the database; and
   the image registration module, in response to determining that the recognized features correspond to the identified image feature associated with the street address from querying the database, adapted to
      update the street address in the database including the GPS location data, the street address associated with the identified image feature.

34. A computer system for performing optical character recognition (OCR) of an image using a database, comprising:
   the database storing a plurality of images, each image associated with one or more keywords, and GPS location data to identifying an actual location of the images;
   an image registration module coupled to the database and adapted to query the database to select at least one image; and
   an OCR module coupled to the image registration module and adapted to:
      perform OCR of the selected image to recognize text that may be contained in the image, wherein the OCR of the image is constrained by at least one of the keywords associated with the image in the database;
      determine if the recognized text contained in the image corresponds to the at least one of the keywords associated with the image; and
      in response to determining that the recognized text contained in the image corresponds to at least one of the keywords associated with the image, assigning an actual GPS location to a street address associated with an image of the plurality of images; and updating the street address in the database to be associated with the GPS location data.

35. A method for constructing a database storing one or more street scene images, each street scene image associated with GPS location data identifying an actual location of the one or more street scene images, the method executed by a computer system, comprising:
   storing in the database of the computer system, a plurality business names, each business name associated with a street address and one or more keywords;
   estimating a street address for a street scene image of the one or more street scene images using the GPS location data associated with the one or more street scene images;
   identifying a target address range based on the estimated street address;
   querying the database to identify a business name of the plurality of business names associated with a street address in the target address range, and to identify the one or more keywords associated with the identified business name;
   performing optical character recognition of the one or more street scene images to recognize text contained in the one or more street scene images, wherein the optical character recognition of the one or more street scene images is constrained by at least one of the identified keywords resulting from querying the database;
   determining if the recognized text contained in the one or more street scene images corresponds to at least one of the identified keywords; and
   updating the business name associated with the street address in the database including the GPS location data of the street scene image.

36. A method for constructing a database storing one or more street scene images, each street scene image associated with GPS location data identifying an actual location of the one or more street scene images, the method executed by a computer system, comprising:

storing in the database of the computer system, a plurality business names, each business name associated with a street address and one or more keywords;

estimating a street address for a street scene image of the one or more street scene images using the GPS location data associated with the one or more street scene images;

identifying a target address range based on the estimated street address;

querying the database to identify a business name of the plurality of business names associated with a street address in the target address range, and to identify the one or more keywords associated with the identified business name;

performing optical character recognition of the one or more street scene images to recognize text contained in the one or more street scene images, wherein the optical character recognition of the one or more street scene images is constrained by at least one of the identified keywords resulting from querying the database;

determining if the recognized text contained in the one or more street scene images corresponds to at least one of the identified keywords; and updating the one or more street scene images in database including the business name associated with the street address in response to determination that the recognized text corresponds to at least on of the identified keywords.

* * * * *

UNITED STATES PATENT AND TRADEMARK OFFICE
CERTIFICATE OF CORRECTION

| | | |
|---|---|---|
| PATENT NO. | : 7,917,286 B2 | Page 1 of 1 |
| APPLICATION NO. | : 11/305694 | |
| DATED | : March 29, 2011 | |
| INVENTOR(S) | : Bret Steven Taylor and Luc Vincent | |

It is certified that error appears in the above-identified patent and that said Letters Patent is hereby corrected as shown below:

Column 14, line 39, after "GPS location data" and before "associated" insert --to be--.

Column 18, line 16, after "at least" delete "on" and insert --one--.

Signed and Sealed this
Seventh Day of June, 2011

David J. Kappos
*Director of the United States Patent and Trademark Office*